United States Patent [19]

Piquot

[11] 4,195,327
[45] Mar. 25, 1980

[54] DEVICE FOR REGULATING THE ANGLE OF ELEVATION OF THE HEADLAMPS OF A VEHICLE

[75] Inventor: Gerard Piquot, Bois-Colombes, France

[73] Assignee: Automobiles Peugeot, Paris, France

[21] Appl. No.: 885,204

[22] Filed: Mar. 10, 1978

[30] Foreign Application Priority Data

Mar. 18, 1977 [FR] France .................. 77 08194

[51] Int. Cl.² .............. B60Q 1/10; F21M 3/00
[52] U.S. Cl. ......................... 362/66; 362/40;
362/272; 362/274; 362/288; 362/385; 362/420;
362/428
[58] Field of Search ............... 362/38, 43, 66, 71,
362/269, 271, 272, 274, 285–288, 385, 386, 420,
427, 428, 40; 315/82

[56] References Cited

U.S. PATENT DOCUMENTS

| 2,373,745 | 4/1945 | Conway | 362/385 |
| 3,846,627 | 11/1974 | Chastain | 362/71 |
| 3,955,173 | 5/1976 | Martin | 362/38 |
| 4,102,712 | 7/1978 | Martin | 362/385 |

FOREIGN PATENT DOCUMENTS 2310240 12/1976 France ................ 362/420

Primary Examiner—Howard A. Birmiel
Attorney, Agent, or Firm—Burns, Doane, Swecker & Mathis

[57] ABSTRACT

The device comprises a bar pivoted to a swing-bar whose ends are each connected to a piston rod of a jack having two positions. The travel of one of the jacks is equal to double the travel of the other. The front end of the bar is connected to the upper part of a headlamp and the bar is connected to the middle of the swing-bar. The ends of the latter are formed over and engaged in notches formed in a support of the device. The edges of the notches constitute abutments for the swing-bar.

3 Claims, 13 Drawing Figures

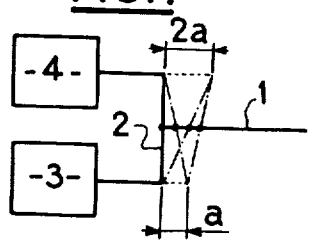
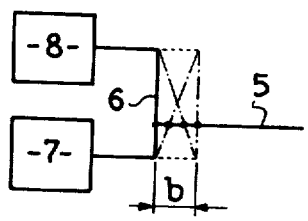
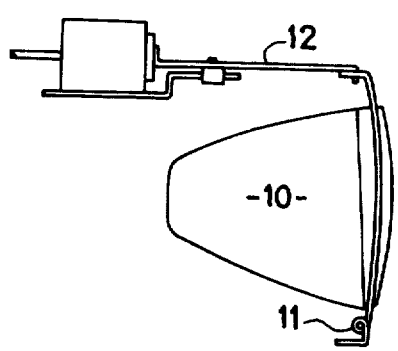
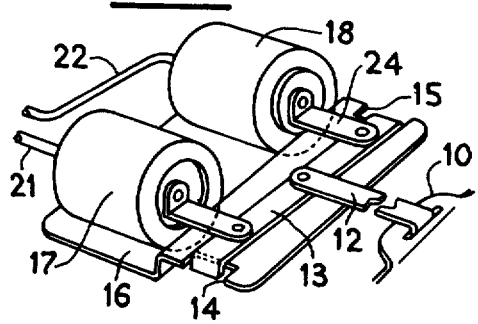
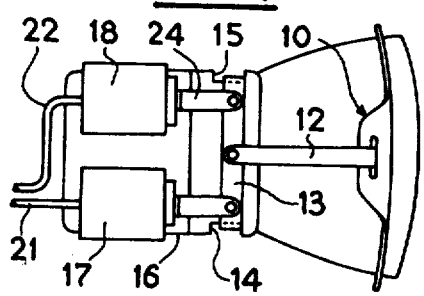
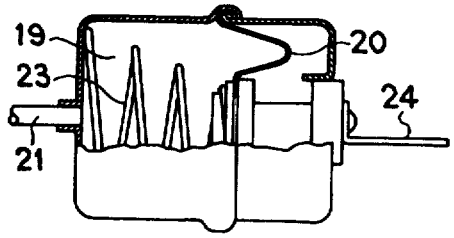
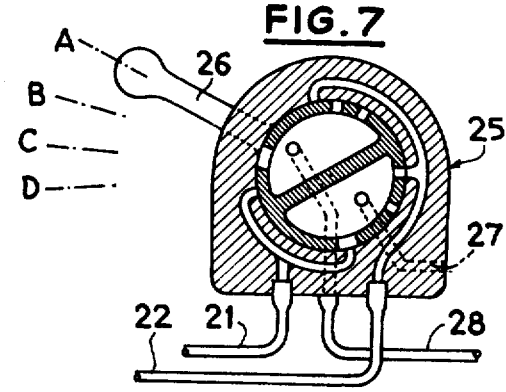

DEVICE FOR REGULATING THE ANGLE OF ELEVATION OF THE HEADLAMPS OF A VEHICLE

The present invention relates to a device having a linear action and four predetermined stable positions. It is in particular applicable to the regulation of the angle of elevation or depression of the headlamps of an automobile vehicle in accordance with its load.

It is known that the inclination of the beam of light given out by a headlamp must be between two relatively narrow limits in order to avoid hindering drivers travelling in the opposite direction and yet ensure a sufficient range. This is why it is necessary to correct the angular position of the headlamps in accordance with the load this being all the more necessary as the suspension of the vehicle is flexible.

Devices having two stable positions operating on the ON-OFF principle are known. Unfortunately, it is impossible with only two positions to remain within the required angular limits for all the vehicle loading conditions.

Devices providing a manually controlled or automatically controlled continuous variation are also known. These devices are usually complicated and very delicate to regulate is the same correction on both headlamps of the same vehicle is to be achieved.

An object of the present invention is to provide a particularly simple and cheap device which is very flexible as concerns its installation, has excellent reliability, provides four angular positions and guarantees the identity of correction between the left and right headlamps.

For this purpose, each headlamp, which is mounted to pivot about a transverse axis perpendicular to the general direction of the light beam, is driven by a linear actuating device according to the invention.

This device comprises driving means mounted on a swing-bar each end of which swing-bar is connected to actuating means capable of occupying two positions.

Depending on the position of the mounting point of the driving means on the swing-bar and on the extent of the travel of each actuating means, the driving means can occupy four different positions according to the respective state of each of the actuating means.

The latter may be formed indifferently by hydraulic or pneumatic jacks or electromagnets.

The ensuing description gives embodiments of the invention with reference to the accompanying drawings, in which:

FIGS. 1 and 2 show diagrammatically the principle of operation of the actuating device;

FIGS. 3 and 4 show in elevation and in plan a vehicle headlamp provided with the device according to the invention;

FIG. 5 is a perspective view of the actuating device corresponding to FIGS. 3 and 4;

FIG. 6 is a sectional view of an actuating jack;

FIG. 7 shows a pneumatic distributing valve whereby it is possible to act manually on the actuating device;

Figure 8:
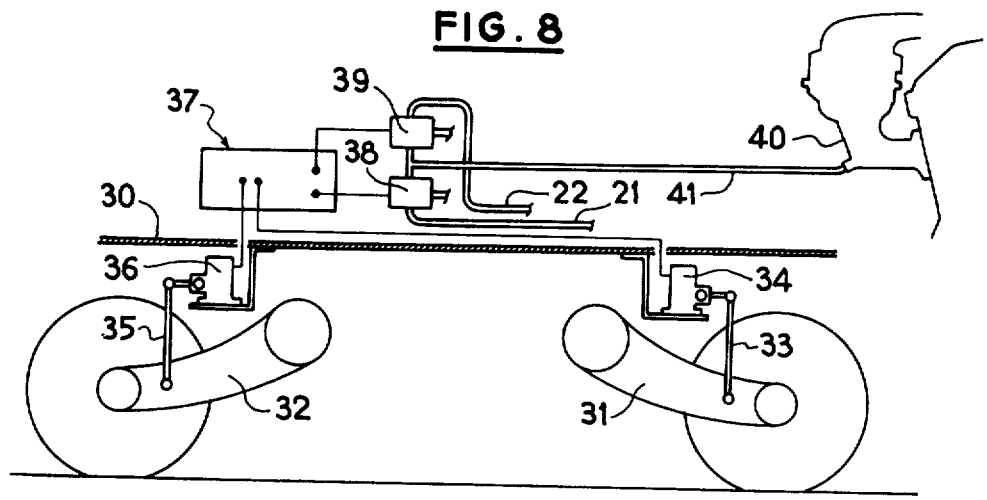
FIG. 8 is a diagram of an automatic control.

In the diagram of FIG. 1 a driving means 1 is mounted in the middle of a swing-bar 2 the ends of which are connected to the rods of two jacks 3, 4. The jack 3 has a travel a and the jack 4 has a travel 2a.

Assuming that the swing-bar 2 occupies the position in full line when the two jacks are at rest, the travel of the driving means 1 is respectively:

a/2 when only the jack 3 is actuated,
a when only the jack 4 is actuated, and
3a/2 when both jacks are actuated.

In this way, four equally-spaced positions are obtainable for the driving means 1.

In the diagram of FIG. 2, a driving means 5 is connected at a point at one third of the length of a swing-bar 6, the ends of which are mounted on the rods of two jacks 7, 8. Each jack has a travel b.

Starting from the position shown in full line in which both jacks are at rest, the travel of the driving means 5 is respectively:

b/3 when only the jack 8 is actuated,
2b/3 when only the jack 7 is actuated,
b when both jacks are actuated.

Four equally-spaced positions are again obtainable.

It will be understood that any other configuration may be adopted, in particular if it is desired to obtain an unequal spacing between the different positions.

FIGS. 3 to 6 show a concrete application of the device according to the invention to the regulation of the angle of elevation or depression of a headlamp 10 of an automobile vehicle.

This headlamp is mounted to pivot about a pivot 11 located in the lower part of the headlamp and the headlamp is positioned by a bar 12 in its upper part.

The bar is mounted on a swing-bar 13 the cranked ends of which are engaged in notches 14, 15 of a support 16 on which two jacks 17, 18 are fixed. As shown in FIG. 6, each jack comprises a suction capsule 19 closed by a diagram 20 and capable of being connected to a source of suction through a pipe 21 or 22. A spring 23 biases the diaphragm 20 in opposition to the action of the suction and the diaphragm 20 is connected to the swing-bar 13 through a rod 24.

In the presently-described embodiment, the travel of each jack is determined by the abutment of each end of the swing-bar 13 against one of the edges of the notches 14 and 15.

The four angular positions of the headlamp 10 are obtained by the following states of the jacks:

both jacks 17 and 18 are connected to the atmosphere, the jack 17 is solely connected to the source of suction, the jack 18 is solely connected to the source of suction, both jacks 17 and 18 are connected to the source of suction.

The regulation may be achieved manually by means of a distributor or control valve 25 such as that shown in FIG. 7.

This valve has nothing original and there seems no reason to make a detailed description thereof. It is actuated by a handle 26 capable of occupying four positions A to D.

In position A, the two pipes 21 and 22 are put in communication with the atmosphere by way of a pipe 27.

In position B, the pipe 21 is still connected to the atmosphere but the pipe 22 is connected to the source of suction through a pipe 28.

In position C, it is the pipe 21 which is connected to the pipe 28 and the pipe 22 is connected to the atmosphere.

In position D, the pipes 21 and 22 are both connected to the pipe 28.

The headlamps may also be regulated automatically as shown in FIG. 8 which illustrates a chassis 30 of an automobile vehicle, a front suspension 31 and a rear suspension 32.

The front suspension 31 is connected by a link 33 to a position detector 34 and the rear suspension 32 is connected by a link 35 to a position detector 36.

Each position detector provides an indication of the displacement of the suspension with which it is associated. This indication is transmitted to a control circuit 37 which acts on electrically-operated valves 38, 39 which permit putting in communication respectively each of the pipes 21, 22 with the atmosphere or with the induction manifold 40 of the engine of the vehicle by way of a pipe 41.

Merely by way of example, a detector such as 34, 36, may be constructed in the way shown in FIGS. 9 to 12.

Each detector comprises a body 41 in which is mounted a piston 46 to be movable by the action of a lever 47 which is mounted to pivot about a pin 48 and driven by one of the connecting links of the suspension corresponding to said detector, the link 33 for example. The transmission of the motion between the lever 47 and the piston 46 is indirect in as much as two springs 49 are inserted between the lever and the piston 46. The displacements of the piston 46 are braked or retarded by a liquid placed in the lower part of the detector. This arrangement ensures that the corrector does not react to all the unevennesses of the road that the suspension might transmit thereto.

Figure 9:
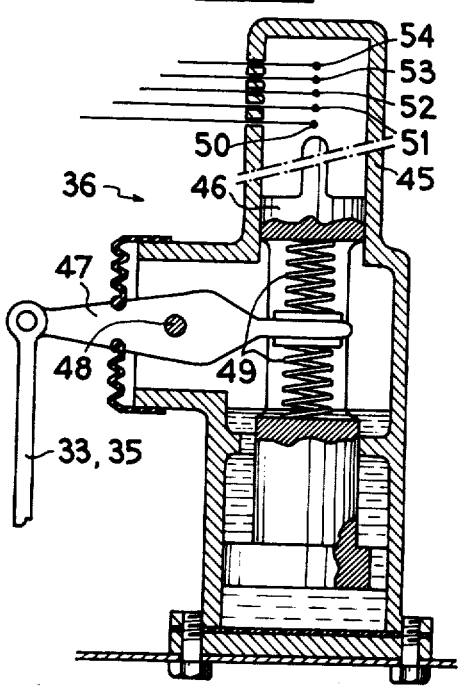
FIGS. 9 to 12 show details of embodiments of detectors which may be used in the automatic control.
Figure 10:
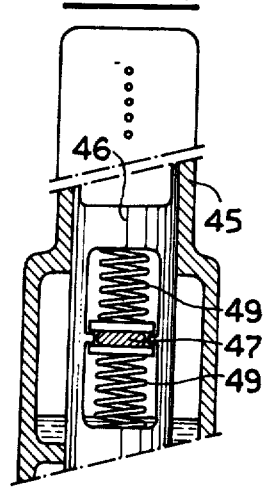

FIG. 9 shows a detector 36 intended for the rear suspension. The body 45 has extending therethrough flexible strips 50 to 54 which are normally insulated from each other but the ends of which are capable of coming successively in contact with each other under the effect of the thrust of the upper end of the piston 46 (all the strips are electrically interconnected when the rear set of wheels is completely unloaded).

Figure 11:
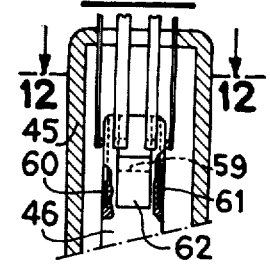
Figure 12:
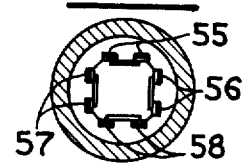

FIGS. 11 and 12 show the upper part of the detector 34 intended for the front suspension. The body 45 has extending therethrough four pairs of strips 55 to 58 which rub along the upper portion of the piston 46 which is provided with conductive zones 59 to 62 of different lengths.

Figure 13:
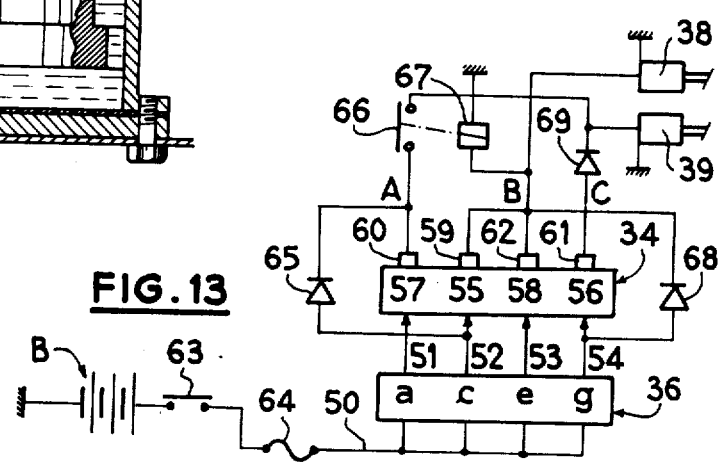
FIG. 13 is an electric diagram controlling the device according to the invention.

FIG. 13 shows an electric circuit diagram corresponding to the foregoing detectors and permits acting on the electrically-operated valves 38, 39 in accordance with the load carried by each of the front and rear suspensions.

It will be understood that the arrangement of the contacts on the detectors, and this diagram, are given merely by way of example and for a well-defined type of vehicle.

In particular, on a vehicle model having high rear flexibility but in which the front suspension would undergo only a small variation of deflection, it would be possible to provide solely a detector at the rear.

In this electric diagram, the detectors 34 and 36 are represented by rectangles.

The detector 36 associated with the rear suspension is connected to the battery B of the vehicle through a main switch having a starter key 63 and a fuze 64 and through a common conductor 50, whereas the strips 51, 52, 53, 54 are respectively connected to the pairs of strips 57, 55, 58, 56 of the detector 34 associated with the front suspension.

The junction of the strips 52 and 55 is connected through a first diode 65 to a terminal of a switch 66 which is actuated by a relay 67 whose coil is connected in series with the conductive zones 59 and 62 of the detector 34.

The junction of the strip 54 of the detector 36 and the strips 56 of the detector 34 is connected to the coil of said relay through a second diode 68 the cathode of which is also connected to the electrically-operated valve 38.

A third diode 69 connects the conductive zone 61 of the detector 34 to the electrically-operated valve 39 which is connected to the terminal of the switch 66 opposed to the diode 65, the conductive zone 60 being connected to the cathode of the latter.

The detectors 34 and 36 are connected in such manner as to translate, in accordance with the value and position of the load on the vehicle, four different positions of the body of the vehicle relative to the horizontal, by four states of the electrically-operated valves 38, 39 which respectively correspond to the four positions of the swing-bar 2 shown in the diagram of FIG. 1.

The arrangement just described provides four angles of elevation or depression for the headlamps 10 of the vehicle.

Having now described my invention what I claim as new and desire to secure by Letters Patent is:

1. A device for regulating the angle of elevation or depression of a vehicle headlamp comprising means for mounting the headlamp on the vehicle to be pivotable about an axis which is transverse to the direction of the beam of light given out by the headlamp, driving means connected to an upper part of the headlamp, a swing-bar connected to said driving means, a support for mounting the swing-bar on the vehicle, the swing-bar being pivotable relative to the support, two fluid-operated jacks carried by the support and each having a rod capable of occupying two positions, means for supplying fluid to the jacks, the swing-bar having end portions respectively pivoted to the rods of the jacks, and abutments fixed relative to the support and cooperable with the end portions of the swing-bar for defining end-to-end travel positions of the swing-bar.

2. A device as claimed in claim 1, wherein notches are provided in the support and said end portions of the swing-bar are at an angle of general plane of the swing-bar and extend into said notches, the notches having edges constitutir g said abutments.

3. A device as claimed in claim 1, wherein the driving means comprise a bar connected to the headlamp and pivoted to the swing-bar.

* * * * *